Patented Sept. 18, 1951

2,568,031

UNITED STATES PATENT OFFICE 2,568,031

THIOPHENOLS AS SELECTIVE HERBICIDES

John H. Standen and Luther L. Baumgartner, Yonkers, N. Y., assignors to The B. F. Goodrich Company, New York, N. Y., a corporation of New York No Drawing. Application May 8, 1947, Serial No. 746,863

4 Claims. (Cl. 71—2.3)

This invention relates to herbicidal compositions and more specifically to compositions containing thiophenols (aryl mercaptans) as selective herbicides.

We have discovered that monothiophenolic compounds are exceedingly effective selective herbicides against such common obnoxious weeds and grasses as, for example, crab grass, foxtail, ragweed, lamb's quarter, oxalis, quack grass, plantain, burdock, Japanese honeysuckle, dandelion, shepherd's purse, poison ivy, Canadian thistle and bindweed. The preferred method of treatment is to apply either an aqueous dispersion or emulsion or a solution of the monothiophenolic compound to the area infested with said weeds. By this means of application the treatment can be uniformly and conveniently applied. When solutions or aqueous dispersions are employed having a concentration of the thiophenol as low as about ⅛% to about 5% or more the activity of the herbicides is noticeable within 24 hours and complete kill of the weeds is achieved in only 7 days for grasses and shallow rooted weeds, and for the deeper rooted and more hardy weeds the complete kill is achieved in about 14 days.

Our herbicidal compositions have many varied uses. A composition of low concentration, about ⅛% to about 1% can be employed, for example, to eradicate weeds from lawns, small grains, especially where a weed-free seed is desired, and hays such as clover and alfalfa where a weed-free hay or seed is desired. The herbicidal compositions of higher concentration, about 2% to 8% or more of the monothiophenolic compounds, can be sprayed on crushed stone or gravel roads and driveways, highway berms, fence rows, tree rows and the like where the growth of weeds and coarse grasses is not desirable and where the usual means of weed removal are impractical. Our compositions are also useful for defoliating plants where the foliage interferes with the harvesting of the desired crop. For example, such plants as peas, beans, potatoes and cotton can be defoliated so that the mechanical harvesting means employed will not become fouled with the plant foliage during harvesting.

The thiophenols, AR—SH, which are useful according to our invention are for example, such compounds as thiophenol; ortho, meta and para thiocresols; and thio alpha and beta naphthols. Other compounds of the structure AR—SH wherein AR is an aryl hydrocarbon radical may also be used.

The following examples are presented to illustrate the effectiveness of our composition. The parts reported therein are by weight.

Example I

A plot of bluegrass about 20 feet square which contained a considerable growth of weeds consisting mainly of crab grass, plantain and dandelion was treated with a solution containing 0.25 part of thio beta naphthol dissolved in 99.75 parts of deobase kerosene, a highly refined kerosene substantially colorless and odorless. Within 24 hours after treatment it was observed that the weeds were dying, and all weeds were dead in 7 to 14 days. It was also observed that the effect on the bluegrass was very slight with the most serious damage being a 7 to 10 day setback in the growth of the grass in a few isolated spots.

Solutions of thio beta naphthol and deobase kerosene of concentration as low as ⅛% to ½% when sprayed on lawns infested with the usual common weeds produced substantially the same results as shown above.

Example II

Solutions containing 2 to 5 parts of meta and para thiocresol and 98 to 95 parts of deobase kerosene were sprayed on the accumulation of weed growth along a fence row between two cultivated fields. A partial list of common weeds and coarse grasses which were present included crab grass, foxtail, ragweed, lamb's quarter, oxalis, quack grass, plantain, burdock, Japanese honeysuckle, dandelion, shepherd's purse and poison ivy. The effect of the spray composition was noticeable in about 24 hours. In 7 days most of the weeds were dead and in 14 days all weed plants were dead.

Our compositions are not only effective weed killers, but they also are effective in preventing the regrowth of weeds. This residual effect would make our composition very effective for weed control along highway berms, in tennis courts, drainage ditches, barn lots, and for driveways and roadways of crushed stone or gravel.

Our compositions are also useful in preventing pre-emergence of weeds and can be applied during the sowing of seed to prevent the weeds from growing up and not only robbing the young crop plants of valuable plant food but also choking out the young tender plants. The following example illustrates the effectiveness of treatment to prevent pre-emergence of weeds.

Example III

Solutions of meta and para thiocresol in deobase kerosene containing 2% to 5% of the thiocresol were sprayed between rows as the seeds were planted. The seeds sprouted and the plants emerged but there were no weeds between the plant rows for 3 weeks or more. Repeated spraying further prevented weed growth between rows.

The thiophenolic compound when applied as aqueous dispersions are equally as effective as the solutions employed in the above examples and for large scale applications for highway berms, fields of small grain and the like would be the preferred method of applying these herbicides.

For these purposes, aqueous dispersions of thiophenolic compounds may be prepared with such dispersing or wetting agents as are typified by the following general classes: sodium and potassium soaps; salts of disproportionated abietic acid known as "rosin soaps"; salts of the hydroxy aldehyde acids present in seaweed known as Algin soaps; alkali-casein compositions; water-soluble lignin sulfonates; long chain alcohols usually containing 11 to 18 carbon atoms; water-soluble sulfates of fatty alcohols; sodium salts of sulfated fatty acid amides; esters of sulfated fatty acids; water-soluble alkyl sulfonates having on the average of 16 carbon atoms; water-soluble aryl sulfonates; alkyl aryl sulfonates; water-soluble aralkyl sulfonates; sorbitan mono-laurate, -palmitate, -stearate and -oleate; and others. These dispersing and wetting agents are sold under numerous trade names and may be either pure compounds or be mixtures of compounds of the same general class and may even contain reaction by-products as impurities.

Usually, aqueous solutions containing about ⅛% to about 5% of the dispersing or wetting agent will be sufficient to disperse the thiophenolic compounds for the purposes of our invention.

The following example of the use of a thiophenolic compound illustrates the utility of these compounds in aqueous dispersions.

Example IV

Aqueous dispersions of meta and para thiocresols containing ¼ to 5% of the thiocresols dispersed in aqueous solutions of Aquarex D, a mixture of the sodium salts of the sulfates of fatty alcohols having 10 to 18 carbon atoms, having a concentration of said dispersing or wetting agent of from ⅛% to about 1% were employed to kill weeds as described above in Examples I, II and III with substantially the same results.

Aqueous emulsions prepared by homogenizing a solution of the thiophenolic compound, such as a solution of the thiophenol in refined deodorized kerosene, with water without the use of a wetting or dispersing agent can also be employed with results substantially equivalent to those disclosed in the above examples.

While we have disclosed specific examples of our invention, we do not thereby desire nor intend to limit ourselves solely thereto, for as hitherto stated other equivalent chemical compounds can be employed and proportions of the active ingredients may be varied if desired without departing from the spirit and scope of our invention as defined in the appended claims.

We claim:

1. A selective herbicidal composition useful for eradicating weeds from grasses without substantially damaging the grasses, said composition comprising an active ingredient uniformly dispersed in an aqueous medium, the active ingredient being an aryl mercaptan selected from the class consisting of thiophenol, alpha- and beta-thionaphthol and ortho-, meta- and para-thiocresol, in the form of the free mercaptan, and being present in the concentration of from ⅛% to 1% by weight.

2. A selective herbicidal composition useful for eradicating weeds from grasses without substantially damaging the grasses, said composition comprising ⅛% to 1% by weight of an unsubstituted thiocresol in the form of the free mercaptan, as the active ingredient, dispersed in an aqueous solution containing 0.125% to 1% by weight of a dispersing agent comprising a water-soluble salt of a fatty alcohol sulfate having 10 to 18 carbon atoms.

3. A selective herbicidal composition useful for eradicating weeds from grasses without substantially damaging the grasses, said composition comprising ⅛% to 1% by weight of thio beta naphthol in the form of the free mercaptan, as the active ingredient, dispersed in an aqueous solution containing 0.125% to 1% by weight of a dispersing agent comprising a water-soluble salt of a fatty alcohol sulfate having 10 to 18 carbon atoms.

4. A selective herbicidal composition useful for eradicating weeds from grasses without substantially damaging the grasses, said composition comprising a kerosene solution of an essential active ingredient which is an aryl mercaptan selected from the class consisting of thiophenol, alpha and beta-thionaphthol and ortho-, meta-, and para-thiocresol in the form of the free mercaptan, dispersed in an aqueous medium as an oil in water emulsion, said composition containing ⅛% to 1% by weight of the said aryl mercaptan.

JOHN H. STANDEN.
LUTHER L. BAUMGARTNER.

REFERENCES CITED

The following references are of record in the file of this patent:

UNITED STATES PATENTS

| Number | Name | Date |
|---|---|---|
| 2,322,761 | Lontz | June 29, 1943 |
| 2,412,510 | Jones | Dec. 10, 1946 |

OTHER REFERENCES

Roark et al.: "List of Organic S Compounds Used as Insecticides," U. S. Dept. of Agr. Bur. of Entom. and Plant Quarantine, Div. of Insecticide Invest. E344, May 1935, pages 10–13.

Certificate of Correction

Patent No. 2,568,031 — September 18, 1951

JOHN H. STANDEN ET AL.

It is hereby certified that error appears in the printed specification of the above numbered patent requiring correction as follows:

Column 4, line 23, for the syllable and hyphen "ever-" read *mer-*; and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*